(12) United States Patent
Mezenner

(10) Patent No.: US 7,072,094 B2
(45) Date of Patent: Jul. 4, 2006

(54) VIA ADHESION IN MULTILAYER MEMS STRUCTURE

(75) Inventor: Rabah Mezenner, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/749,277

(22) Filed: Dec. 31, 2003

(65) Prior Publication Data

US 2005/0146770 A1 Jul. 7, 2005

(51) Int. Cl.
*G02B 26/00* (2006.01)

(52) U.S. Cl. .................. 359/290; 359/291; 359/292

(58) Field of Classification Search ........ 359/290–292, 359/298, 318, 212, 213, 220–226, 198, 846, 359/849, 850, 872, 876; 438/50, 52, 53; 216/2, 11; 257/415, 417

See application file for complete search history.

(56) References Cited

U.S. PATENT DOCUMENTS

2003/0095318 A1  5/2003  DiCarlo et al.

*Primary Examiner*—Loha Ben
*Assistant Examiner*—Jack Dinh
(74) *Attorney, Agent, or Firm*—Charles A. Brill; Wade James Brady, III; Frederick J. Telecky, Jr.

(57) ABSTRACT

A method of fabricating improved vias in a multilayer MEMS device. Via seats are patterned into first layer, such that each via will have a via seat at the bottom of the via opening. The via openings are then patterned into a second layer. A third layer of material is deposited, such that the material at least partly fills the via opening and the via seat. The material forms a support post that is anchored to the first layer by means of the material in the via seat.

16 Claims, 4 Drawing Sheets

VIA ADHESION IN MULTILAYER MEMS STRUCTURE

TECHNICAL FIELD OF THE INVENTION

This invention relates to micro-electromechanical systems (MEMS) devices and their fabrication, and more particularly to a method of improving via adhesion in MEMS devices having a multi-layered structure.

BACKGROUND OF THE INVENTION

Many MEMS (microelectromechanical systems) devices use "vias" to electrically or mechanically connect one layer to another. The vias are typically made by forming an opening through an intermediate layer, such as by patterned holes or trenches.

An example of a MEMS devices that uses such vias is the Digital Micromirror Device™ (DMD™), manufactured by Texas Instruments Incorporated. The DMD is a fast, reflective digital light switch. It can be combined with image processing, memory, a light source, and optics to form a digital light processing system capable of projecting large, bright, high-contrast color images.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, address electrodes under the mirror are activated to cause the mirror to rotates in one direction. With the memory cell in a second state, the mirror rotates to the opposing direction. Vias are used to conduct electricity from a bias/reset bus under the mirrors to the mirrors themselves or from memory cells to address electrodes.

SUMMARY OF THE INVENTION

One aspect of the invention is an improved via for multilayer MEMS devices. The via is in effect, a support post, formed by first patterning a via seat in a first layer. Next, the via opening is patterned into a second layer. Then, material is deposited over the second layer, such that the material enters the via and fills or coats the via opening and the via seat. The material in the via seat forms an "anchor" for the via.

In some embodiments, the via seat in the first layer is formed by patterning a hole in a via landing pad. In other embodiments, the via overlaps the landing pad entirely or partially, such that the via seat is a ring or partial ring around the landing pad.

The above-described method is useful for making the mirror support posts of a digital micromirror device. For such devices, the material used to fill the via openings may be the same material as used for the mirrors or may be a different material.

An advantage of the invention is that it improves via adhesion in multilayer MEMS structures. Material deposited in the via will adhere to the via sidewalls and anchor the via. This solution does not add processes or use more wafer "real estate". Via adhesion becomes less sensitive to via size, which was previously a limiting factor for reducing the size of MEMS structures.

DETAILED DESCRIPTION OF THE INVENTION

The following description is in terms of fabrication of a via that is part of a DMD pixel. For this application, the via is used to both mechanically support the pixel mirror and to provide an electrical connection from an underlying layer to the mirror. In effect, due to the application of a metal layer over the layer in which the via is formed, metal coats the inner walls of the vias and forms electrically conductive support posts.

As explained below, the method of the invention involves providing a via having an anchoring "seat" at its bottom surface. An overlying layer of material is then deposited to fill or coat the inner walls of the via. The overlying layer need not be metal, particularly when the via is used for support rather than electrical connection.

The same concepts may be applied to types of digital micromirror devices, and even more broadly, to other MEMS structures having vias. For any of these structures, the method describes herein provides a improved via, which comprises a support post that adheres well to the underlying structure.

DMD Design

Figure 1:
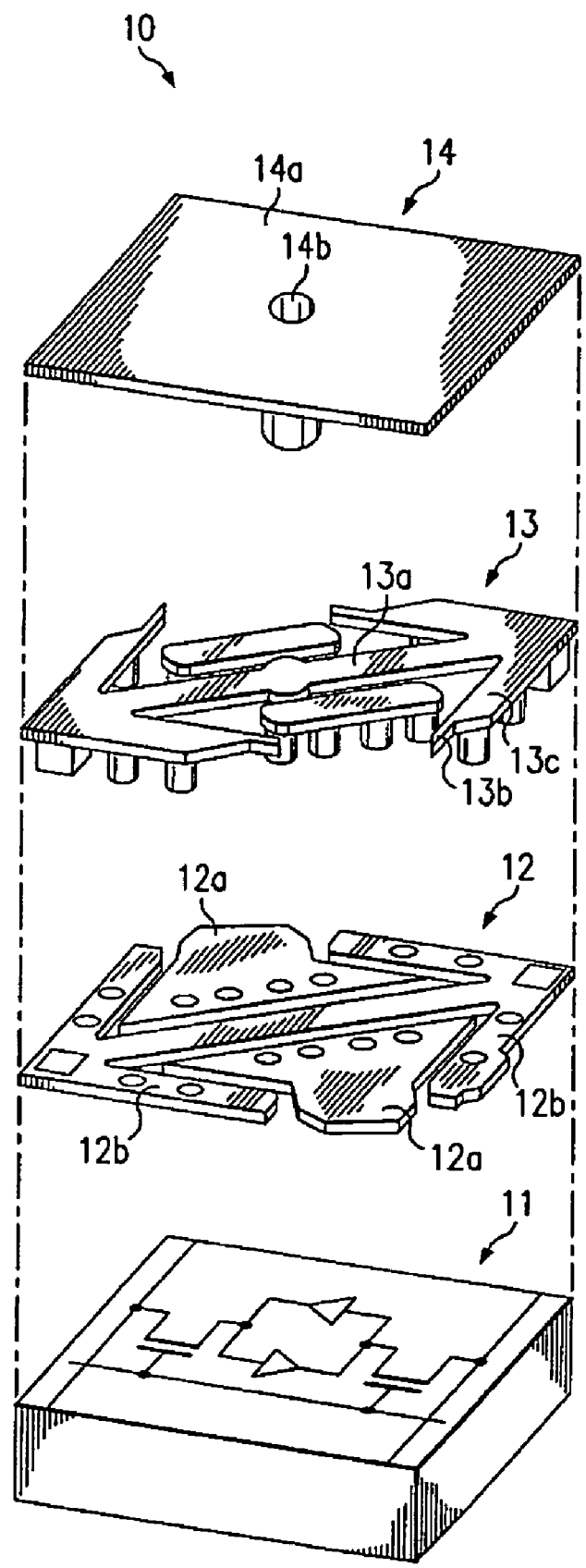
FIG. 1 is an exploded view of a DMD pixel element in accordance with the invention.

FIG. 1 is an exploded view of a DMD pixel element 10 in accordance with the invention. Pixel element 10 is one of an array of such elements fabricated on a wafer, using semiconductor fabrication techniques. Pixel 10 is a "yokeless" pixel, and is representative of various pixel designs used in micromirror MEMS devices.

DMD pixel element 10 is a monolithically integrated MEMS superstructure cell fabricated over a CMOS memory cell 11. Two sacrificial layers (see FIGS. 2 and 10) have been removed by plasma etching to produce air gaps between three metal layers (12, 13, 14) of the superstructure. For purposes of this description, the three metal layers are "spaced" apart by being separated by these air gaps.

The uppermost metal layer 14 has a reflective mirror 14a. The air gap under the mirror 14a frees the mirror 14a to rotate about a compliant torsion hinge 13a, which is part of the second metal layer 13. A third metal (M3) layer 12 has address electrodes 12a for the mirror 14a, the address electrodes 12a being connected to memory cell 11. The M3 layer 12 further has a bias/reset bus 12b, which interconnects the mirrors 14a of all pixels to a bond pad at the chip perimeter. An off-chip driver supplies the bias waveform necessary for proper digital operation.

The DMD mirrors 14a typically range from 10 um to 16 um square and made of aluminum for maximum reflectivity. They are arrayed on 11 um to 17 um centers to form a dense matrix of pixels. The hinge layer 13 under the mirrors 14a permits a close spacing of the mirrors 14a, and because of the underlying placement of the hinges, an array of pixel elements 10 is referred to as a "hidden hinge" type DMD architecture.

In operation, electrostatic fields are developed between the mirror 14a and its address electrodes 12a, creating an electrostatic torque. This torque works against the restoring torque of the hinge 13a to produce mirror rotation in a positive or negative direction. The mirror 14a rotates until it comes to rest (or lands) against spring tips 13b, which are part of the hinge layer 13. These spring tips 13b are attached to the addressing layer 12, and thus provide a stationary but flexible landing surface for the mirror 14a.

DMD Fabrication

FIGS. 2–10 illustrate the DMD fabrication process. The vias in accordance with the invention are discussed in connection with mirror vias 14b, whose fabrication is discussed below in connection with FIGS. 7–9.

Figure 2:
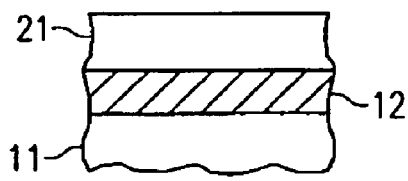
FIG. 2 is a cross sectional view of the layers of a DMD wafer through deposition and etching of a first spacer layer.

FIG. 2 is a cross sectional view of the layers of a DMD wafer through the deposition of the first spacer (S1) layer 21. The fabrication of the DMD superstructure begins with a completed CMOS memory circuit 11. Circuit 11 may be a conventional 5T or 6T SRAM cell. A thick oxide is deposited over the CMOS-surface and then planarized, such as by using a chemical mechanical polish (CMP) technique. The CMP step provides a completely flat substrate for DMD superstructure fabrication.

Through the use of photomasking techniques, the first metal (M3) layer 12 is formed above the CMOS 11. Layer 12 is formed with aluminum for address and bus circuitry. The aluminum is sputter-deposited and plasma-etched. Layer 12 may be etched in a pattern used for DMD structures previously described in U.S. Pat. No. 6,028,690, entitled "Reduced Micromirror Gaps for Improved Contrast Ratio", and in U.S. Pat. No. 5,583,688, entitled "Multi-level Digital Micromirror Device", both assigned to Texas Instruments Incorporated. These patents are incorporated by reference herein.

A spacer layer 21, identified as S1, is then deposited over the M3 layer 12. Spacer layer 21 may be formed from hardened photoresist. Later in the packaging flow, this spacer layer 21 is plasma-ashed to form an air gap. A number of vias are then formed in spacer layer 21, formed by conventional pattern and etching techniques.

Figure 3:
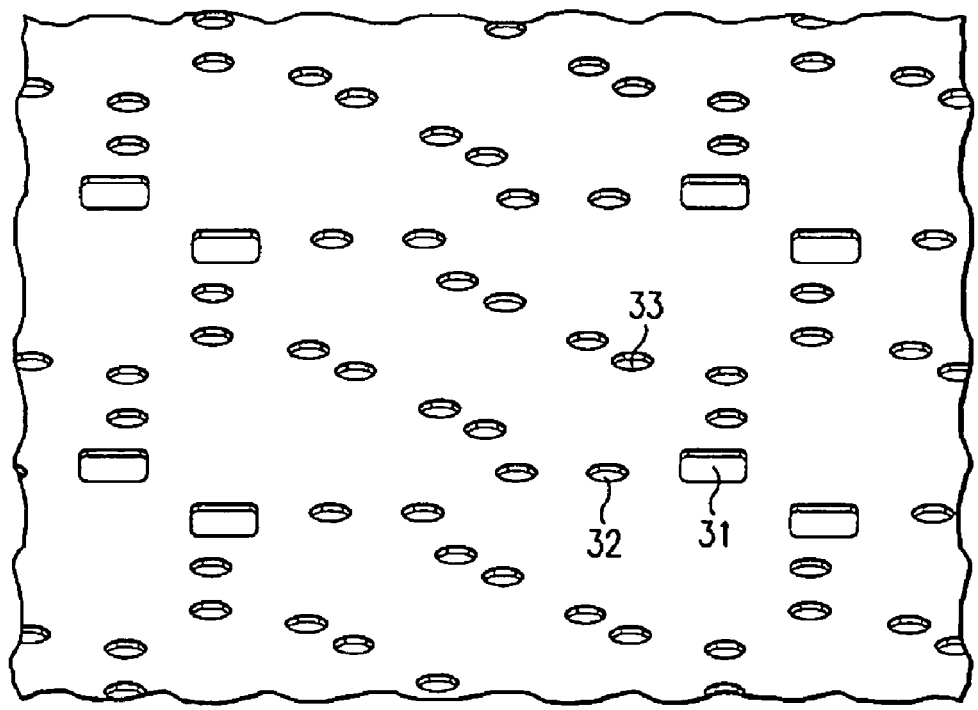
FIG. 3 is a perspective view of the surface of the first spacer layer.

FIG. 3 is a perspective view of the surface of the first spacer layer 21 after the vias have been formed. It illustrates hinge support vias 31, spring tip support vias 32, and electrode support vias 33.

Figure 4:
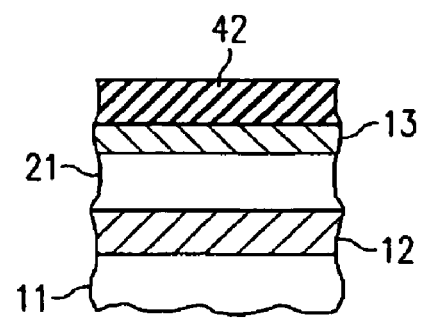
FIG. 4 is a cross sectional view of the layers of a DMD wafer through deposition of a hinge metal layer and oxide layer.
Figure 5:
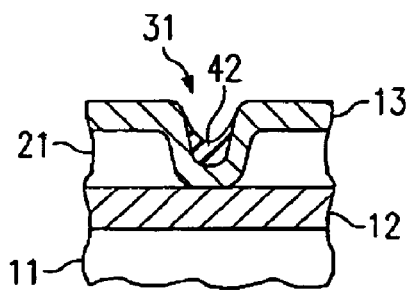
FIG. 5 is a cross sectional view of the layers of a DMD wafer through deposition and etching of a first spacer layer.
Figure 6:
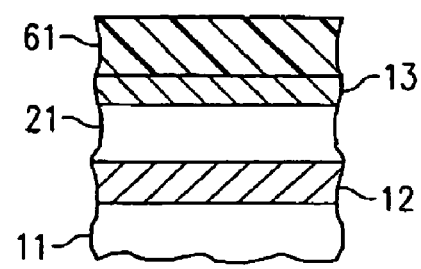
FIG. 6 is a cross sectional view of the layers of a DMD wafer through deposition of a hinge patterning layer.

FIGS. 4–6 illustrate fabrication of hinge layer 13. As explained below, binge layer 13 contains both hinge 13a, spring tips 13b, and spring tip beams 13c (shown in FIGS. 1 and 7) from which the spring tips extend.

Referring to FIG. 4, the hinge layer 13 is formed by deposition of the hinge metal layer 13 and an oxide layer 42. The hinge metal is typically an aluminum alloy, such as AlTiO. An example of a suitable thickness for hinge layer 13 is 700 angstroms. An example of a suitable thickness for oxide layer 42 is 5000 angstroms.

FIG. 5 illustrates a portion of the partially fabricated DMD having a via 31, similar to vias 32 and 33 of FIG. 3, and the result of a patterned etch process. The etch leaves an oxide coating within the via 31. The oxide at the bottom of the vias covers the thin metal at the bottom of each via, thereby providing strengthening. A develop rinse is then performed, or other cleanup to remove residue and prevent surface contamination. As an alternative to a patterned etch, a blanket etch could be used, which would tend to leave the oxide on the via side walls. As an alternative to oxide layer 42, a metal material rather than oxide could be deposited.

FIG. 6 illustrates the deposition and patterning of a hinge patterning layer 61. The patterning layer 61 is etched with a hinge etch mask in the pattern illustrated in FIG. 1. Then patterning layer 61 is chemically removed. The patterned hinge layer 13 is then descumed.

Figure 7:
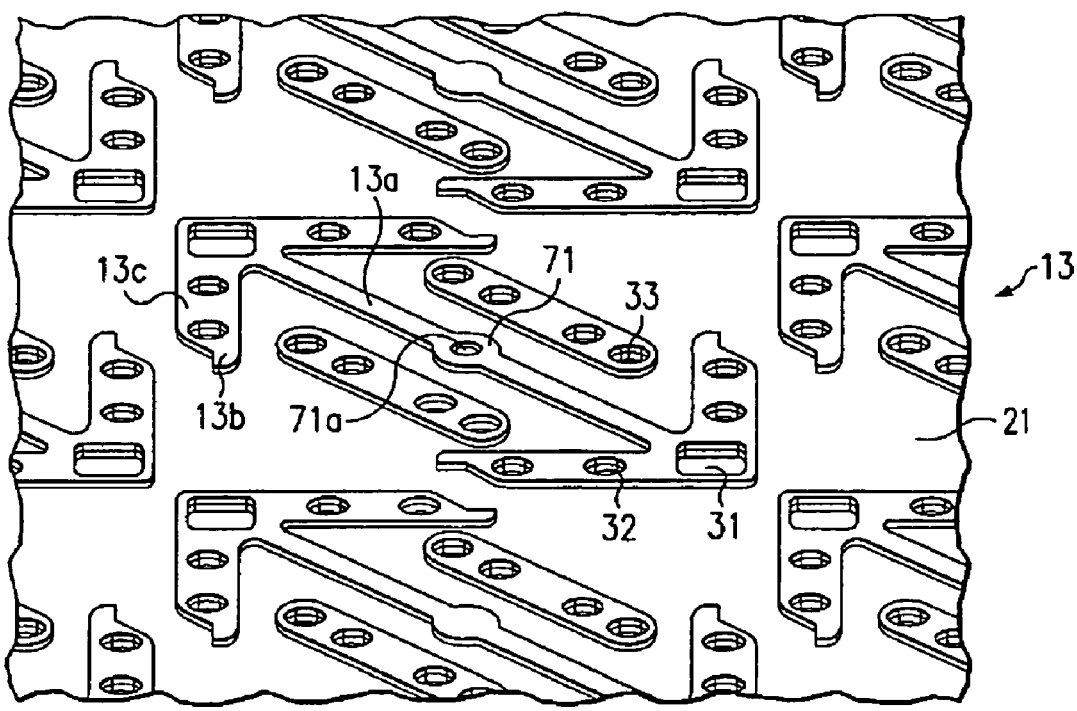
FIG. 7 is a perspective view of the surface of the hinge layer after patterning.

FIG. 7 is a perspective view of the surface of the patterned hinge layer 13. The various vias 31, 32, 33 are shown, as well as a mirror via pad 71, upon which the mirror via 14b will end. The vias 31, 32, 33, now filled with deposited oxide material, will form support posts after the spacer layer 21 is removed. Two spring tips 13b are located under each of the two tilting corners of mirror 14a. In the embodiment of FIG. 7, the hinge 13a and spring tips 13b form a continuous pattern with the two spring tip beams 13c extending at an angle from each end of hinge 13a, but other patterns are possible.

As illustrated in FIG. 7, the hinge layer pattern includes a "mirror via seat" 71a within each mirror via pad 71. This seat is a small circular trough in each pad 71. As explained below in connection with FIGS. 12 and 13, the mirror via seat helps to anchor the mirror support post (via) 14b to pad 71.

Figure 8:
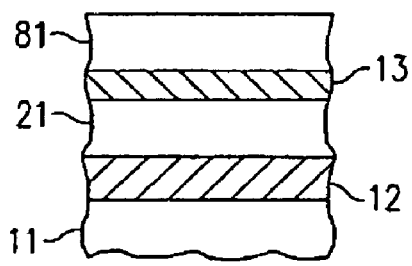
FIG. 8 is a cross sectional view of the layers of a DMD wafer through deposition of a second spacer layer.

FIG. 8 illustrates the deposition of second spacer (S2) layer 81. The mirror vias 14b, illustrated in FIG. 1, are patterned and etched through layer 81. The spacer resist is then cured and the surface descumed.

Figure 9:
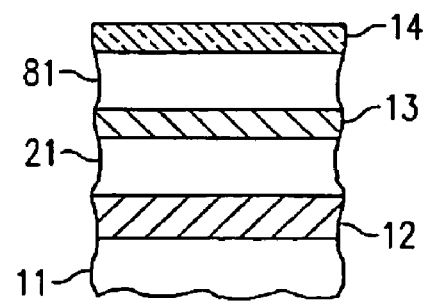
FIG. 9 is a cross sectional view of the layers of a DMD wafer through deposition of a mirror metal layer.

FIG. 9 illustrates deposition of metal mirror layer 14, from which mirror 14a is patterned. A typical thickness for mirror layer 14 is 3300 angstroms. The metal for mirror layer 14 is typically aluminum or an alloy of aluminum. As explained below, the metal layer coats the inner walls of vias, which are designed for good adhesion of the metal to the via and to the surface at the bottom of the via.

Figure 10:
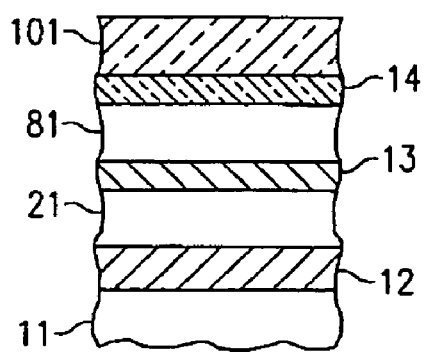
FIG. 10 is a cross sectional view of the layers of a DMD wafer through deposition of a mirror patterning layer.

FIG. 10 illustrates deposition of a mirror patterning layer 101, which is used to pattern mirror 14a. Mirror layer 14 is patterned and etched, leaving the mirror 14a of FIG. 1.

The packaging flow begins with the wafers partially sawed along the chip scribe lines to a depth that will allow the chips to be easily broken apart later. The chips are separated from the wafer, and proceed to a plasma etcher that is used to selectively strip the organic sacrificial layers, S1 and S2, from under the mirror layer 14 and hinge layer 13. The chips are then plasma-cleaned, lubricated, and hermetically sealed in a package. At one or more points during and/or after the packaging flow, the chips are tested for electrical and optical functionality.

Figure 11:
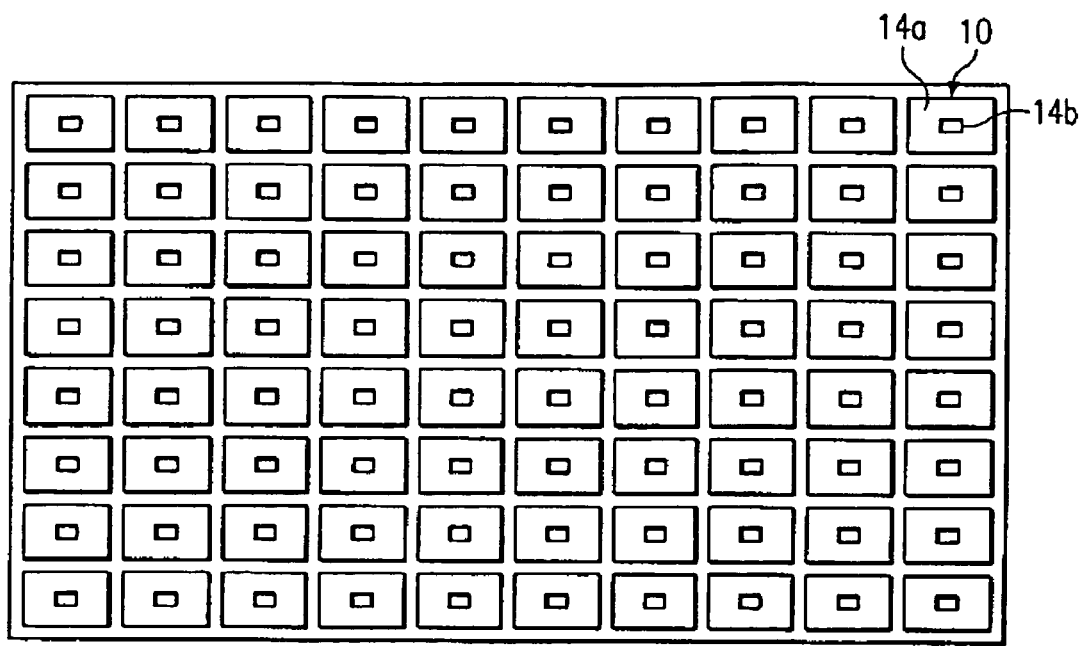
FIG. 11 is a top plan view of the mirror elements of a DMD array.

FIG. 11 is a top view of an array 110 of mirror elements 10. The top surfaces of mirrors 14a, each having a via 14b, are visible in this view. DMD arrays often have more than a thousand rows and columns of pixel elements 10. Packaged DMD chips are commercially available in various array sizes. For example, SVGA (800×600) and SXGA (1280×1024) arrays have been made. The diagonals of the active area range from 0.55 inches to 1.1 inches.

Mirror Via Anchoring

As indicated above in connection with FIG. 7, each mirror via pad 71 has a small seat 71a designed to provide better anchoring for mirror vias 14b. The pad 71 is a feature in layer 13, patterned to provide a landing pad for the mirror via 14b atop hinge 13a. In other embodiments, a via (such as mirror via 14b) could be formed over any portion of an underlying layer (such as layer 13) that is to be attached to an upper layer through the via.

Figure 12:
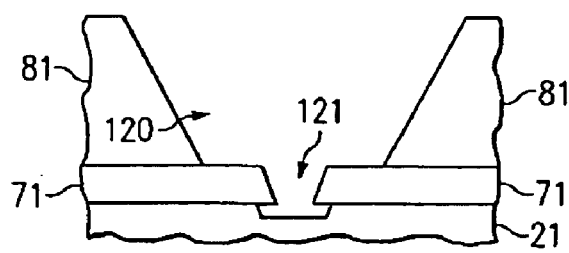
FIG. 12 is a cross sectional via of a via opening in a spacer layer and a via seat in an underlying layer, prior to deposition of material atop the spacer layer.

FIG. 12 is a cross sectional view of a mirror via opening 120 through spacer layer 81 and the mirror via seat in pad 71. This view is subsequent to the etching of the via openings, as described above in connection with FIG. 8.

In the example of this description, spacer layer 81 is a sacrificial layer, that is, it is eventually removed to leave an air gap between hinge layer 13 and mirror layer 14. However, whether or not spacer layer 81 is to be removed is not significant to the invention.

Referring to both FIGS. 12 and 7, the mirror via seat 121 is simply a small circular trough in mirror via pad 71. In the example of FIG. 12, the etch process used to form the via seat 121 has resulted in an opening all the way through layer 71 as well as an undercut into the underlying spacer layer 21.

In other embodiments, the via seat could be shallower, that is, it might not go all the way through the thickness of pad 71. Also, in other embodiments, via seat 121 could have a geometry other than circular; its patterning could be for any shape etched into the underlying pad 71 (or other portion of layer 13). The circumference of the via seat relative to the via opening may vary. A further embodiment, with a via seat surrounding a via pad is described below in connection with FIG. 14. For the general case, where the via seat is patterned into any portion of layer 13 (shown only as via and 71 in FIGS. 12–14), the via seat may be designed for whatever combination of adhesion to the top of layer 13, sidewalls into layer 13, and undercut under layer 13 best anchors the via.

Figure 13:
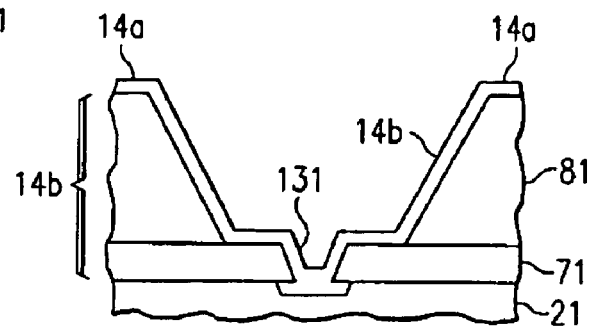
FIG. 13 illustrates the via opening of FIG. 12, with material deposited to form a support post type via in accordance with the invention.

FIG. 13 is the same view as FIG. 12, but after the mirror patterning (mirror metal) layer 14 has been deposited over spacer layer 81. The mirror metal has adhered to the top surface of spacer layer 81, the sidewalls of the mirror via opening 120 (shown in FIG. 12), and the sidewalls and bottom of the mirror via seat 121 (shown in FIG. 12). Material has also filled the undercut in the spacer layer 21. The metal on the top of spacer layer 81 forms the mirrors 14a; the metal within the via opening and via seat forms the mirror vias 14b. The spacer layer 81 will eventually be removed, so that each mirror via 14b supports its mirror 14a onto mirror via pad 71.

The metal-filled via 14b may also be referred to as a mirror "support post". The mirror via seat 121 is coated or filled with metal, and forms a mirror support post anchor 131. The metal used to form the mirror support posts is the same metal as used for the mirror structure, but embodiments could be possible in which the material used to fill the support posts is deposited solely for that purposes.

In the example of this description, the deposited material (here a metal) does not completely fill the via opening, such that the support post is hollow. In other embodiments, the deposited material could fill the via opening. The deposited material may or may not completely fill the via seat.

The formation of mirror via seat 121 and its metal coating provide improved support for mirror via 14b, as compared to designs in which there is no mirror via seat 121 (shown in FIG. 12). Another benefit is stress relief of hinge layer 13.

Figure 14:
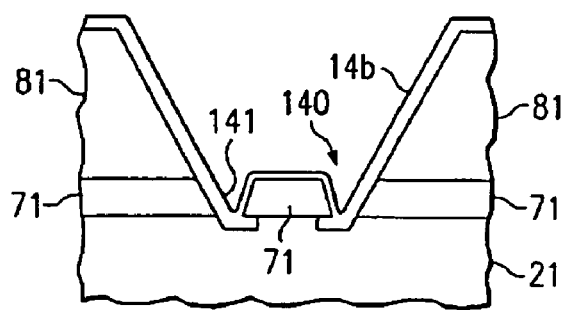
FIG. 14 illustrates an alternative to the via seat of FIG. 12, in which the via seat is a ring around a via pad.

FIG. 14 illustrates a via seat 140 that is patterned around a pad 71 of layer 13 (shown in FIG. 7), and filled with material to form a via anchor 141. The via seat 140 overlaps the pad 71 completely or partially, for example, by etching a pad 71 that is smaller than the via opening. The deposited material enters the area around the pad 71 and any undercut into layer 21. In effect, the deposited material forms a ring or partial ring as the via anchor 141.

For the embodiment of FIG. 14, in the case of a micromirror device, the result is a via 14b that "hugs" the sides of pad 71. Further in the case of the micromirror device, the "pad" could simply be a straight portion in the middle of the hinge.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. An array of micromirror pixels, comprising:
   a mirror layer having a mirror associated with each pixel;
   a hinge layer spaced under the mirror layer, the hinge layer having a hinge under each mirror and attached to the mirror such that the mirror may tilt above the hinge layer;
   an address layer spaced under the hinge layer, the address layer having circuitry for controlling operation of the pixels; and
   wherein each mirror is connected to the hinge layer with a via support post, the via support post being made from a material that at least partly fills a via opening and a via seat patterned into the hinge layer.

2. The array of claim 1, wherein the material is a conductive material.

3. The array of claim 1, wherein the material is the same material as the mirror material.

4. The array of claim 1, wherein the mirror via seat is patterned onto a pad on the hinge.

5. The array of claim 4, wherein the mirror via seat at least partially overlaps the pad.

6. A multilayer MEMS structure having an improved via, the via comprising:
   a support post formed by patterning a via seat in a first layer and a via opening in a second layer, and by depositing material over the second layer, such that the material enters the via and fills or coats the via opening and the via seat.

7. The MEMS structure of claim 6, wherein the material is conductive.

8. The MEMS structure of claim 6, wherein the second layer is a sacrificial layer.

9. The MEMS structure of claim 6, wherein the via seat is patterned into a via pad.

10. The MEMS structure of claim 9, wherein the via seat at least partially overlaps the pad.

11. The MEMS structure of claim 6, wherein the material deposited over the second layer forms a third layer of MEMS structure as well as the support post.

12. A method of forming a via in a multilayer MEMS structure, comprising the steps of:
 patterning via seats into a first layer;
 patterning via openings into a second layer; and
 depositing material over the second layer such that the material at enters the via opening and at least partly fills the via seat and the via opening.

13. The method of claim 12, wherein the material is conductive.

14. The method of claim 12, wherein the second layer is a sacrificial layer.

15. The method of claim 12, wherein the material deposited over the second layer forms a third layer of MEMS structure as well as the support post.

16. A method of forming a micromirror array, comprising the steps of:
 forming control circuitry on a semiconductor substrate;
 depositing a first spacer layer on the substrate;
 patterning the first spacer layer to define hinge support vias and spring tip support vias;
 depositing a hinge layer over the first spacer layer;
 forming at least one hinge etch mask on the hinge layer;
 patterning the hinge layer to form at least one hinge and at least one via seat on the hinge;
 depositing a second spacer layer over the hinge layer;
 patterning the second spacer layer to define mirror via openings;
 depositing a metal mirror material over the second spacer layer, such that the mirror material at least partly fills the via seats and the via openings;
 patterning the metal mirror layer to form an array of micromirrors; and
 removing the first and the second spacer layers.

* * * * *